(12) United States Patent
Peardon et al.

(10) Patent No.: US 6,311,131 B1
(45) Date of Patent: Oct. 30, 2001

(54) METHOD OF AND APPARATUS FOR DETERMINING THE QUALITY OF SEISMIC DATA

(76) Inventors: Lloyd Peardon, Kencana iv No. 1, Pondok Indah, Jakarta (ID), 12420; Ian Richard Scott, 10 Regalfield Close, Guildford, Surrey, GU2 6YG (GB)

( * ) Notice: Subject to any disclaimer, the term of this patent is extended or adjusted under 35 U.S.C. 154(b) by 0 days.

(21) Appl. No.: 09/180,206

(22) PCT Filed: May 2, 1997

(86) PCT No.: PCT/GB97/01213

§ 371 Date: Apr. 26, 1999

§ 102(e) Date: Apr. 26, 1999

(87) PCT Pub. No.: WO97/42526

PCT Pub. Date: Nov. 13, 1997

(30) Foreign Application Priority Data

May 8, 1996 (GB) .................................................. 9609612

(51) Int. Cl.$^7$ ........................................................ G01V 1/28
(52) U.S. Cl. .................................................................. 702/14
(58) Field of Search ................................. 702/14, 17, 18; 367/76, 25, 26, 45

(56) References Cited

U.S. PATENT DOCUMENTS

| | | | |
|---|---|---|---|
| 4,204,279 | * | 5/1980 | Parrack et al. ........................ 702/17 |
| 4,509,150 | * | 4/1985 | Davis ..................................... 702/14 |
| 4,759,636 | * | 7/1988 | Ahern et al. .......................... 702/17 |

\* cited by examiner

Primary Examiner—Donald E. McElheny, Jr.
(74) Attorney, Agent, or Firm—John H. Bouchard

(57) ABSTRACT

A method of determining the quality of seismic data comprises the steps of defining a predetermined threshold (step 12) from a characteristic of a first set of seismic data and translating the difference between the predetermined threshold and the corresponding characteristic of a second set of seismic data into a measure of quality of the second set of seismic data (step S16).

22 Claims, 5 Drawing Sheets

METHOD OF AND APPARATUS FOR DETERMINING THE QUALITY OF SEISMIC DATA

BACKGROUND OF THE INVENTION

The present invention relates to a method of and an apparatus for determining the quality of seismic data during or after a seismic survey.

At present, the quality of a seismic survey is generally determined by use of instruments or engineering specifications located above a survey site, for example a fixed μbar limit for ambient noise or a prescribed gun drop-out limit. In some cases, failure to meet these criteria can lead to a survey being halted unnecessarily, resulting in increased cost through loss of production.

SUMMARY OF THE INVENTION

According to the present invention, there is provided a method of determining the quality of seismic data, comprising the steps of defining a predetermined threshold from a characteristic of a first set of seismic data and translating the difference between the predetermined threshold and the corresponding characteristic of a second set of seismic data into a measure of quality of the second set of seismic data.

Preferably, the first set of seismic data comprises a model used to define the predetermined threshold.

Preferably, the predetermined threshold is defined using existing seismic data.

Preferably, the first set of seismic data comprises a plurality of seismic traces and the predetermined threshold is modified on the basis of a succeeding set of seismic traces.

The characteristic may be the resolving power, the resolving factor, the signal-to-noise ratio, the effective bandwidth, the detectability, the upper frequency range, or the lower frequency range of the seismic data.

According to a second aspect of the present invention, there is provided an apparatus for determining the quality of seismic data, comprising a means for defining a predetermined threshold from a characteristic of a first set of seismic data, and a means for translating the difference between the predetermined threshold and the corresponding characteristic of a second set of seismic data into a measure of quality of the second set of seismic data.

BRIEF DESCRIPTION OF THE DRAWINGS

The invention will now be described in greater detail, by way of example, with reference to the accompanying drawings, in which.

DESCRIPTION OF THE PREFERRED EMBODIMENT

Figure 1:
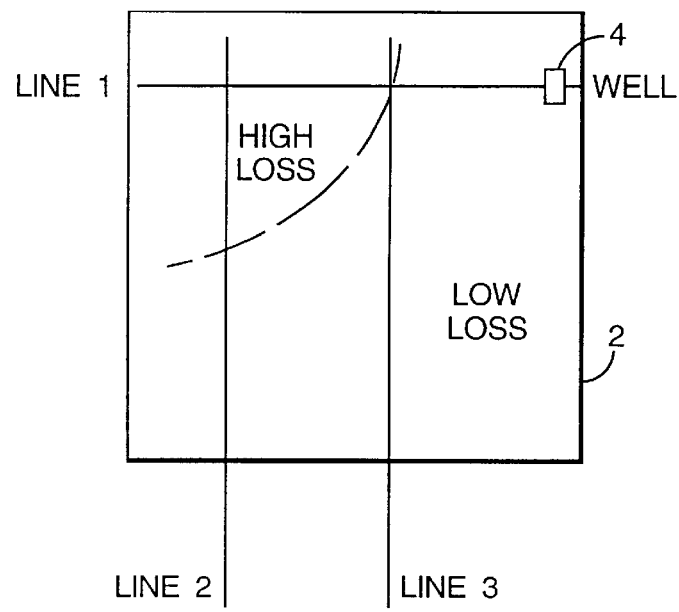
FIG. 1 is a schematic diagram of a survey site.

Referring to FIG. 1, a marine survey site 2 comprises a region of low loss and a region of high loss beneath the surface of the survey site 2. The region of high loss, in this example, is due to a ridge. A set of well bore data, for example, bore logs and VSP data from a well 4 and a set of surface seismic data taken along lines 1, 2 and 3 from previous seismic surveys of the survey site 2 are available (not shown). The term "a set of seismic data" includes one or more seismic traces.

Figure 2:
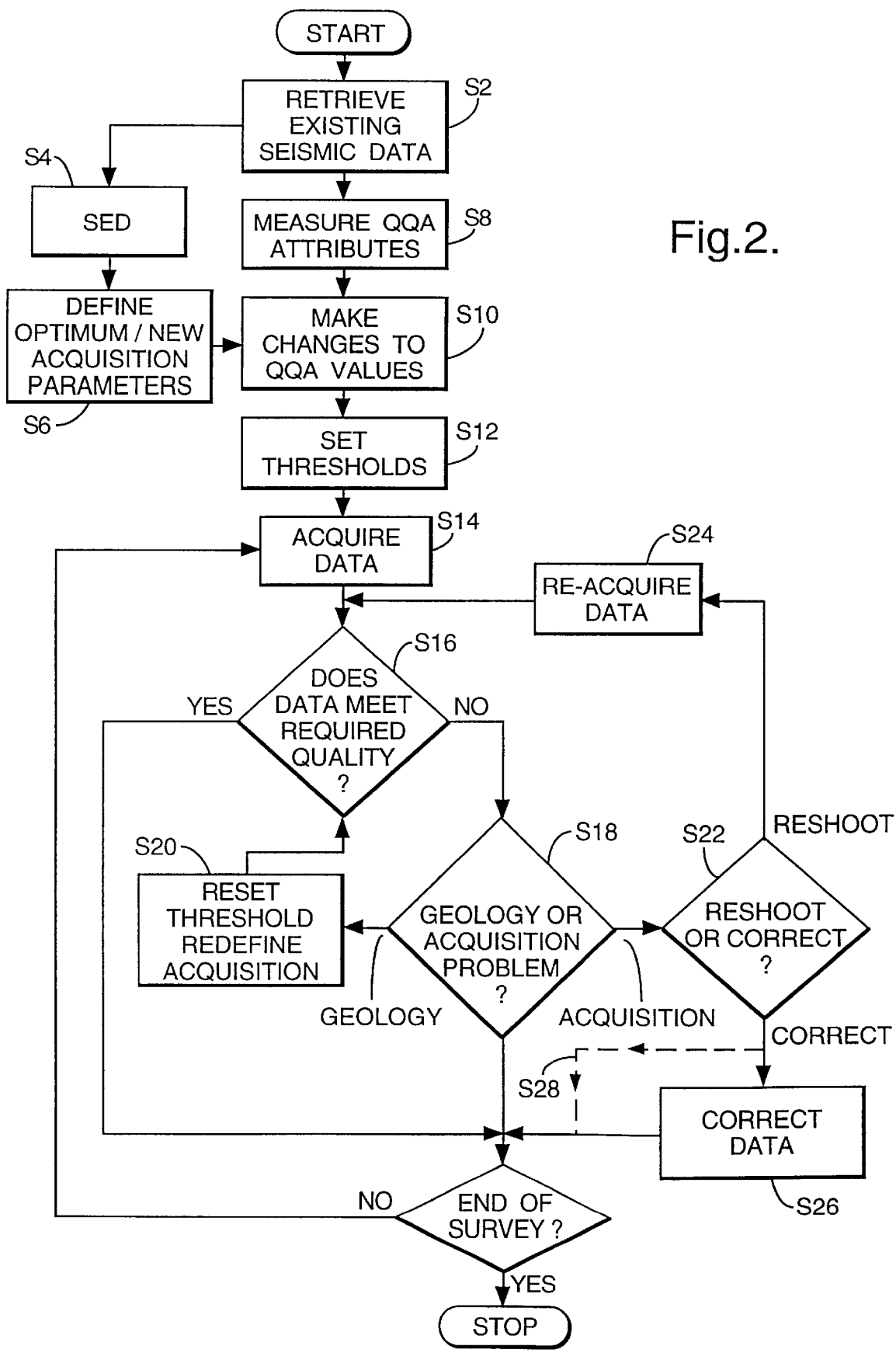
FIG. 2 is a flow diagram showing method steps for surveying the survey site of FIG. 1 according to an embodiment of the present invention.

The known well bore data and surface seismic data are retrieved (step S2, FIG. 2) and used to evaluate and design a new seismic survey (step S4).

Figure 3:
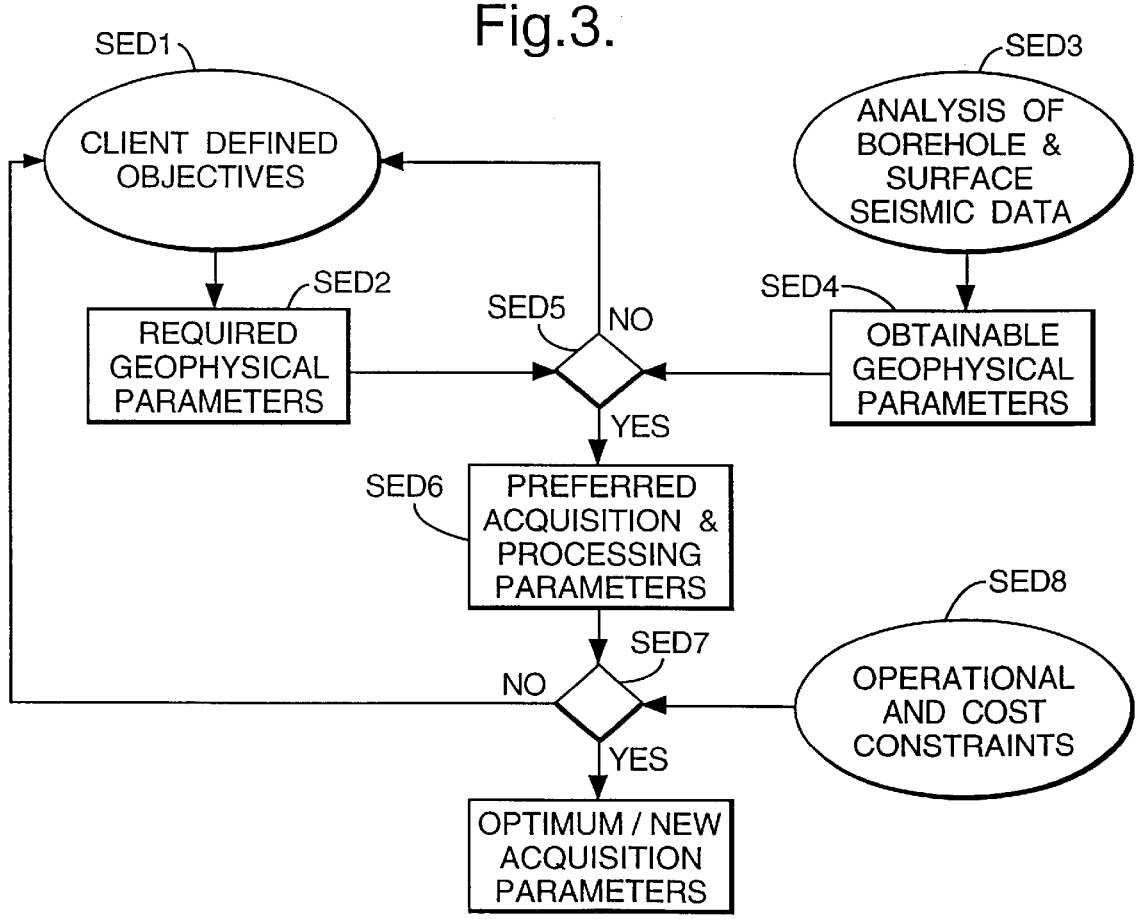
FIG. 3 is a schematic diagram of a step of FIG. 2 in greater detail.

Referring to FIG. 3, objectives of the new seismic survey, for example formation depth, structural setting and lithological description of a prospect model, are defined (step SED1) and a set of "required" geophysical parameters are defined (step SED2), for example, target resolution parameters, such as interval velocities, resolution requirements and source energy.

The known well bore and surface seismic data are analysed (step SED3) in conjunction with other available data, such as tidal information and weather reports, in order to define a set of corresponding achievable geophysical parameters (step SED4). For example, VSP data is used as a measure for determining signal bandwidth. Other parameters include temporal resolution, migration aperture, signal to noise ratio, spatial resolution, offset distribution and azimuth distribution.

The required and achievable geophysical parameters are compared (step SED5) in order to determine if the above objectives can be met and a set of preferred acquisition and geophysical parameters are defined (step SED6), provided that the required geophysical parameters are within the scope of the achievable geophysical parameters. However, if the required geophysical parameters are not achievable, the above objectives are modified until the required geophysical parameters fall within the achievable geophysical parameters (step SED7). Examples of the preferred acquisition and processing parameters include source and streamer depths, group and shotpoint intervals, in-line and cross-line CMP spacing, record length, migration aperture, receiver offset range, shooting direction, maximum feather, amplitude v. offset (AVO), dip moveout (DMO), demultiple, noise suppression, imaging and sampling interval.

The operational costs and constraints are then examined (step SED8) in order to ascertain whether the preferred acquisition and processing parameters are feasible on the basis of the costs and equipment constraints. For example, resolution has a direct effect on the costs of line spacing. If necessary, the objectives are redefined in order to take account of the above constraints in order to provide the final "optimum" acquisition and processing parameters.

Once a final set of optimum acquisition and processing parameters are defined (step S6, FIG. 2/step SED6, FIG. 3), a set of Quantitative Quality Assurance (QQA) parameters are measured (step S8) for the known data. On the basis of the final parameters (which may differ, for example, in acquisition parameters from the known data), the QQA values are modified (step S10) by modelling the expected changes due to the preferred parameters. The modified values are then used to define the minimum acceptable threshold above which the attribute of the newly acquired seismic data must remain in order to be of an acceptable quality to attain the objectives defined. Such a situation can arise when, for example, the known seismic data is acquired using deep streamer cable and the evaluation and design of the new seismic survey indicates that the optimum acquisition parameters should include shallow streamer cable.

Other parameters include: source depth, source volume, trace interval and fold. Table 1 below shows old and new values of acquisition parameters and the effect of changes therein on newly acquired seismic data.

TABLE 1

Effects of changes in acquisition parameter values.

| Parameter | Old value | New value | Effect on new data |
|---|---|---|---|
| Source vol. | 6400 cu in | 3397 cu in | Higher ambient noise |
| Source depth | 4 m | 5 m | Slightly lower frequency |
| Cable depth | 7 m | 7 m | None |
| Group interval | 16.667 m | 12.5 m | Shots have less random noise |
| CMP interval | 8.33 m | 12.5 m | Stack has more random noise |
| Fold | 60 | 40 | Stack has more random noise |

Figure 4:
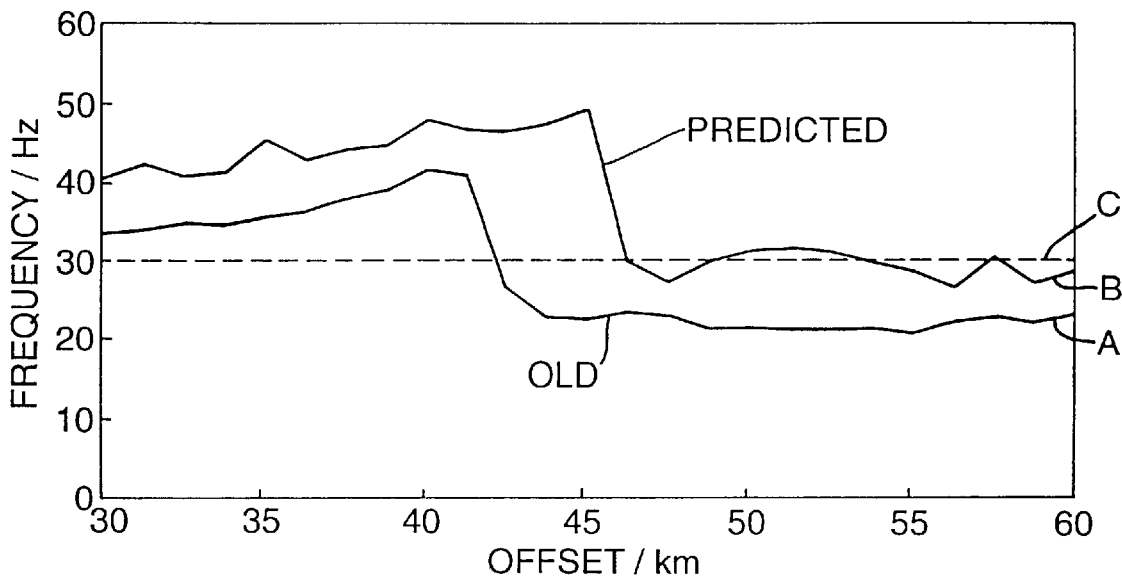
FIG. 4 is a schematic diagram of an old and predicted attribute in accordance with the embodiment of FIG. 2.

In order to define the thresholds, sample wavelets are taken from the known surface seismic data. The surface seismic data can be surface seismic data which has been calibrated against borehole derived wavelets (where available) at intersection points between the surface seismic data and the borehole location or theoretically calculated wavelets using a given geological model. Various attributes or characteristics of the wavelets, for example, the High Frequency Effective Bandwidth (HFEB), are determined and a corresponding set of predicted attributes are derived (FIG. 4). The thresholds of the attributes are then set (step S12).

Table 2 shows an example of attributes and their threshold values.

TABLE 2

Attribute thresholds

| Attribute | Shots | Stacks |
|---|---|---|
| Resolving Power | 10 | 20 |
| Resolving Factor | 30 | 40 |
| Signal to Noise | 30 | 80 |
| Detectability | 100 | 1000 |
| High Frequency (Hz) | 20 | 30 |
| Low Frequency (Hz) | 20 | 20 |

Referring back to FIG. 4, curve A shows the high frequency effective bandwidth of the known seismic data and curve B shows the predicted high frequency bandwidth for the new seismic data to be acquired. On the basis of curves A and B, a threshold value of 30 Hz is set as the minimum value of the predicted HFEB (shown as broken line C) within a margin of error.

The new seismic data is then acquired (step S14) and one or more of the above mentioned attributes of the newly acquired data is compared with the corresponding thresholds (step S16). If the seismic data is of sufficiently good quality (within specification), the or each attribute is equal to or greater than the corresponding threshold and the acquisition continues.

If the quality of the data is unacceptable (below specification), the cause of the poor seismic data quality is investigated (step S18). If the cause is found to be of a geological nature, for example a ridge, all effected attribute thresholds are modified or the acquisition redefined (step S20), for example, by adjusting the depth of the streamers.

If it is found that the cause is acquisition related, for example poor weather or equipment failure, a decision is made as to whether to reacquire the effected seismic data, or whether to simply correct it (step S22), for example, by correcting a technical failure, such as air pressure or gun synchronisation. If a decision is made to reacquire the seismic data, the seismic data which is below specification is reacquired (step S24) and step S16 is repeated (and steps S18 to S28—depending on whether or not the reacquired seismic data is within specification). If a decision is made not to reacquire the seismic data, the seismic data can either be corrected (step S26) or if, deemed appropriate, the correction step is omitted (see broken line—step S28) and acquisition of the new seismic data is continued.

Figure 5:
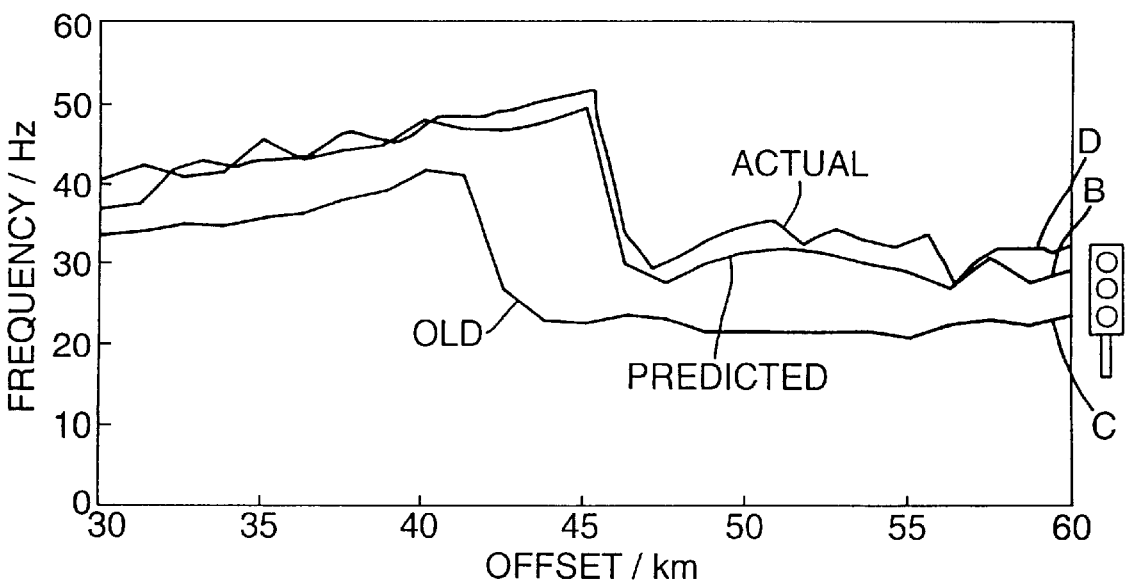
FIG. 5 is a schematic diagram of an old, predicted and actual attribute in accordance with the embodiment of FIG. 2.

When the seismic survey of the survey site 2 has been completed or during acquisition of the new seismic data, the actual high frequency bandwidth or other attributes of the acquired seismic data can be calculated and plotted. Curve D in FIG. 5 represents the high frequency bandwidth of the newly acquired seismic data and is above the 30 Hz threshold previously set. This indicates that this attribute of the newly acquired seismic data is within specification and so of an acceptable quality.

Figure 6:
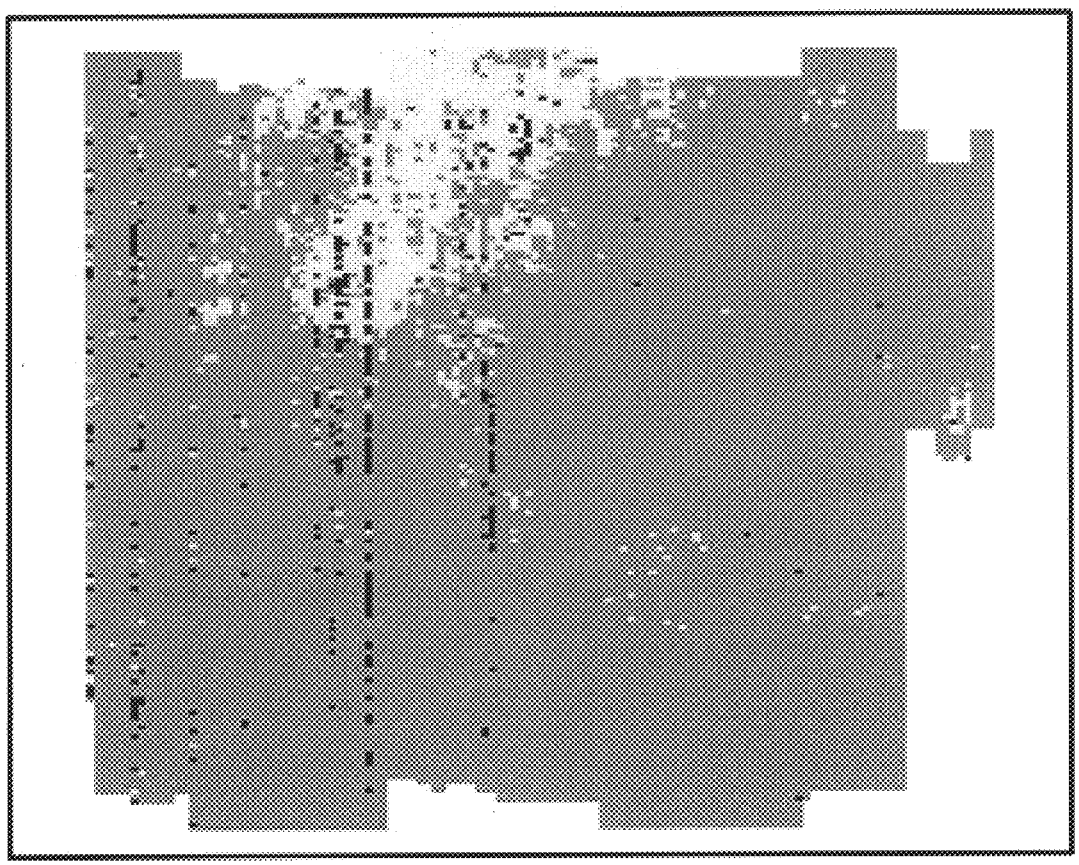
FIGS. 6 and 7 are a real plots of the survey site of FIG. 1.

An a real plot of the high frequency bandwidth or other attributes of the newly acquired seismic data can be generated (FIG. 6). The darker regions of the plot represent areas of the survey site 2 where the high frequency bandwidth attribute of the new seismic data is within specification. The lighter regions of the plot represents areas where the high frequency bandwidth attribute has fallen below an acceptable quality threshold and so is below specification.

By comparing the a real plot of FIG. 6 with the survey site 2 of FIG. 1, it can be seen that there is a correspondence between the areas of high loss of the survey site 2 and the lightly shaded areas, especially the upper right hand quadrant of the a real plot. As described above, the cause of such results has to be investigated to determine whether the result is due to the geology of the survey site 2 or acquisition problems.

Figure 7:
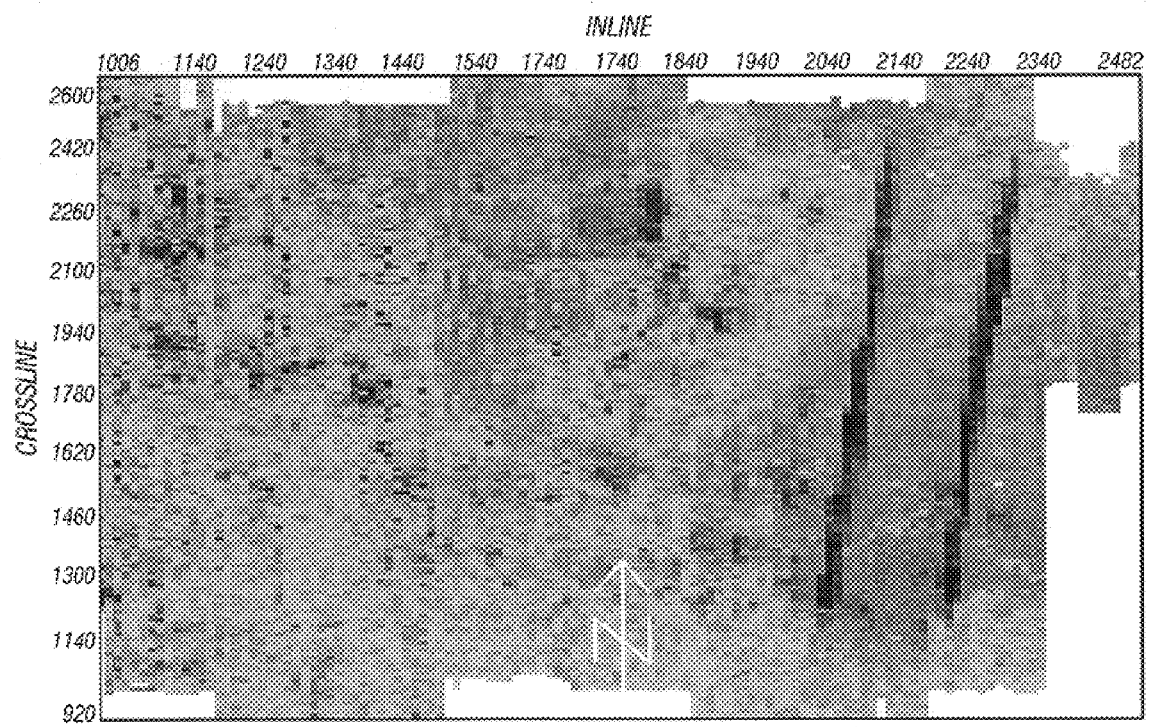

As another example, an a real plot of the resolving factor of the newly acquired seismic data can be generated (FIG. 7).

It is also possible to generate a final a real plot consolidating previous individual plots relating to individual attributes.

The a real plots can be generated in colour in accordance with a "traffic light" scheme. Areas where an attribute is clearly within specification can be plotted in green, areas where the attribute is marginally in or below specification can be plotted in amber, and areas where the attribute is clearly below specification can be plotted in red.

Although the above embodiment describes a 'real time' seismic survey where the quality of seismic data is evaluated as it is acquired, it is conceivable to evaluate the quality of the seismic data in accordance with the invention once the entire survey site 2 has been surveyed. However, the reacquisition of seismic data over areas having acquisition related problems is no longer possible.

The above embodiment has been described in the context of a marine seismic survey. However, it should be noted that the above invention can be equally applied to land seismic surveys.

What is claimed is:

1. A method of determining a quality of a second set of seismic data from a first set of existing seismic data, comprising the steps of:

(a) retrieving said first set of existing seismic data;

(b) determining, from said first set of existing seismic data, a minimum acceptable threshold associated with a characteristic of said first set of existing seismic data;

(c) acquiring said second set of seismic data, said second set of seismic data having one or more corresponding characteristics, whereby said one or more corresponding characteristics of said second set of seismic data must remain above said threshold in order to determine that said second set of seismic data is of acceptable quality in accordance with a set of defined objectives;

(d) comparing said one or more corresponding characteristics of said second set of seismic data with said threshold;

(e) determining that said second set of seismic data is of acceptable quality when said one or more corresponding characteristics of said second set of seismic data is equal to or greater than said threshold; and (f) determining that said second set of seismic data is not of acceptable quality when said one or more corresponding characteristics of said second set of seismic data is not equal to or greater than said threshold.

2. The method of claim 1, wherein the determining step (b) for determining, from said first set of existing seismic data, a minimum acceptable threshold comprises the steps of:

(b1) in response to the retrieving step (a), defining a final set of optimum acquisition and processing parameters;

(b2) measuring a set of Quantitative Quality Assurance parameters in connection with said first set of existing seismic data;

(b3) changing the Quantitive Quality Assurance parameters in accordance with said final set of optimum acquistion and processing parameters to thereby produce a set of modified Quantitative Quality Assurance parameters; and (b4) determining, from said set of modified Quantitative Quality Assurance parameters, said minimum acceptable threshold.

3. The method of claim 2, wherein the defining step (b1) for defining a final set of optimum acquisition and processing parameters comprises the steps of:

(b1.1) defining a set of client defined objectives associated with a new seismic survey, said second set of seismic data being acquired during the acquiring step (c) when said new seismic survey is performed;

(b1.2) defining a set of required geophysical parameters in response to said objectives defined during the defining step (b1.1);

(b1.3) analyzing said first set of existing seismic data, representing a known set of wellbore and surface seismic data, in conjunction with other available data thereby producing a set of corresponding achievable geophysical parameters;

(b1.4) in order to determine if said set of client defined objectives can be met, comparing the set of required geophysical parameters with the set of corresponding achievable geophysical parameters and producing said final set of optimum acquisition and processing parameters when the set of required geophysical parameters are within a scope of said set of corresponding achievable geophysical parameters.

4. The method of claim 1, further comprising the steps of:

(g) when, during the determining step (f), said second set of seismic data has been determined not to be of acceptable quality, investigating a cause of an unacceptable condition of said second set of seismic data, the investigating step including the steps of determining whether said unacceptable condition is of a geological nature or if said unacceptable condition is acquisition related;

(h) when the unacceptable condition is of a geological nature, modifying all effected attribute thresholds and repeating the comparing step (d);

(i) when the unacceptable condition is acquisition related, determining if said second set of seismic data should be reacquired;

(j) reacquiring at least a portion of said second set of seismic data which is unacceptable when the determining step (i) reveals that said second set of seismic data should be reacquired and repeating the comparing step (d); and (k) when the determining step (i) reveals that said second set of seismic data should not be reacquired, either correcting said second set of seismic data or acquiring a third set of new seismic data.

5. The method of claim 4, wherein the determining step (b) for determining, from said first set of existing seismic data, a minimum acceptable threshold comprises the steps of:

(b1) in response to the retrieving step (a), defining a final set of optimum acquisition and processing parameters;

(b2) measuring a set of Quantitative Quality Assurance parameters in connection with said first set of existing seismic data;

(b3) changing the Quantitive Quality Assurance parameters in accordance with said final set of optimum acquistion and processing parameters to thereby produce a set of modified Quantitative Quality Assurance parameters; and (b4) determining, from said set of modified Quantitative Quality Assurance parameters, said minimum acceptable threshold.

6. The method of claim 5, wherein the defining step (b1) for defining a final set of optimum acquisition and processing parameters comprises the steps of:

(b1.1) defining a set of client defined objectives associated with a new seismic survey, said second set of seismic data being acquired during the acquiring step (c) when said new seismic survey is performed;

(b1.2) defining a set of required geophysical parameters in response to said objectives defined during the defining step (b1.1);

(b1.3) analyzing said first set of existing seismic data, representing a known set of wellbore and surface seismic data, in conjunction with other available data thereby producing a set of corresponding achievable geophysical parameters;

(b1.4) in order to determine if said set of client defined objectives can be met, comparing the set of required geophysical parameters with the set of corresponding achievable geophysical parameters and producing said final set of optimum acquisition and processing parameters when the set of required geophysical parameters are within a scope of said set of corresponding achievable geophysical parameters.

7. The method of claim 6, wherein said characteristic is a resolving power.

8. The method of claim 6, wherein said characteristic is a resolving factor.

9. The method of claim 6, wherein said characteristics is a signal to noise ratio.

10. The method of claim 6, wherein said characteristics is an effective bandwidth.

11. The method of claim 6, wherein said characteristics is a detectability.

12. The method of claim 6, wherein said characteristics is an upper frequency range.

13. The method of claim 6, wherein said characteristics is a lower frequency range of the seismic data.

14. An apparatus for determining a quality of a second set of seismic data from a first set of existing seismic data, comprising:

first means for retrieving said first set of existing seismic data;

second means for determining, from said first set of existing seismic data, a minimum acceptable threshold associated with a characteristic of said first set of existing seismic data;

third means for acquiring said second set of seismic data, said second set of seismic data having one or more corresponding characteristics, whereby said one or more corresponding characteristics of said second set of seismic data must remain above said threshold in order to determine that said second set of seismic data is of acceptable quality in accordance with a set of defined objectives;

fourth means for comparing said one or more corresponding characteristics of said second set of seismic data with said threshold;

fifth means for determining that said second set of seismic data is of acceptable quality when said one or more corresponding characteristics of said second set of seismic data is equal to or greater than said threshold; and said fifth means determining that said second set of seismic data is not of acceptable quality when said one or more corresponding characteristics of said second set of seismic data is not equal to or greater than said threshold.

15. The apparatus of claim 14, wherein said characteristic is a resolving power.

16. The apparatus of claim 14, wherein said characteristic is a resolving factor.

17. The apparatus of claim 14, wherein said characteristics is a signal to noise ratio.

18. The apparatus of claim 14, wherein said characteristics is an effective bandwidth.

19. The apparatus of claim 14, wherein said characteristics is a detectability.

20. The apparatus of claim 14, wherein said characteristics is an upper frequency range.

21. The apparatus of claim 14, wherein said characteristics is a lower frequency range.

22. A method of determining a quality of seismic data, comprising the steps of:

defining a predetermined threshold associated with a characteristic of a first set of seismic data; and translating a difference between said predetermined threshold and a corresponding characteristic of a second set of seismic data into a measure of quality associated with said second set of seismic data.

* * * * *